UNITED STATES PATENT OFFICE.

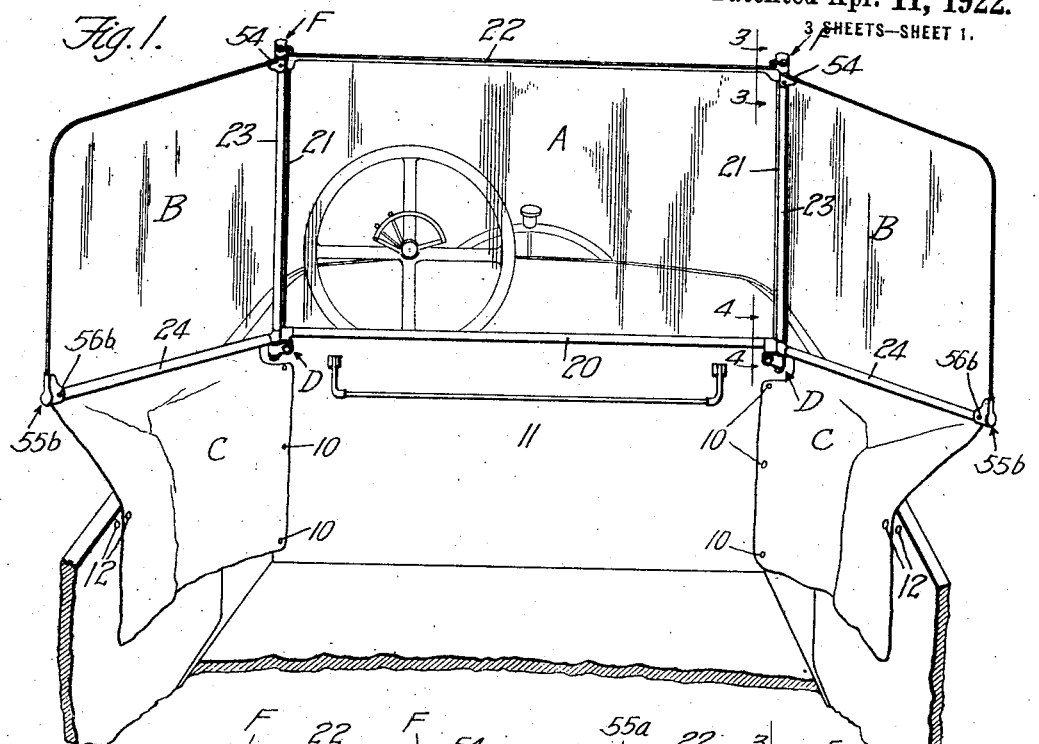
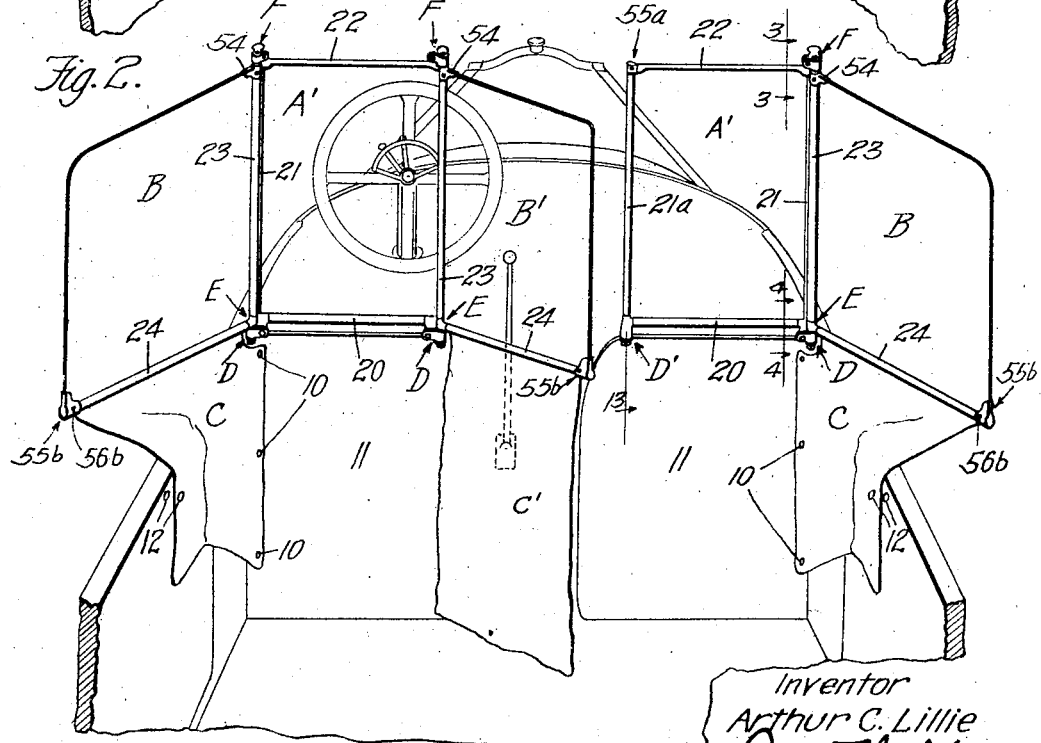

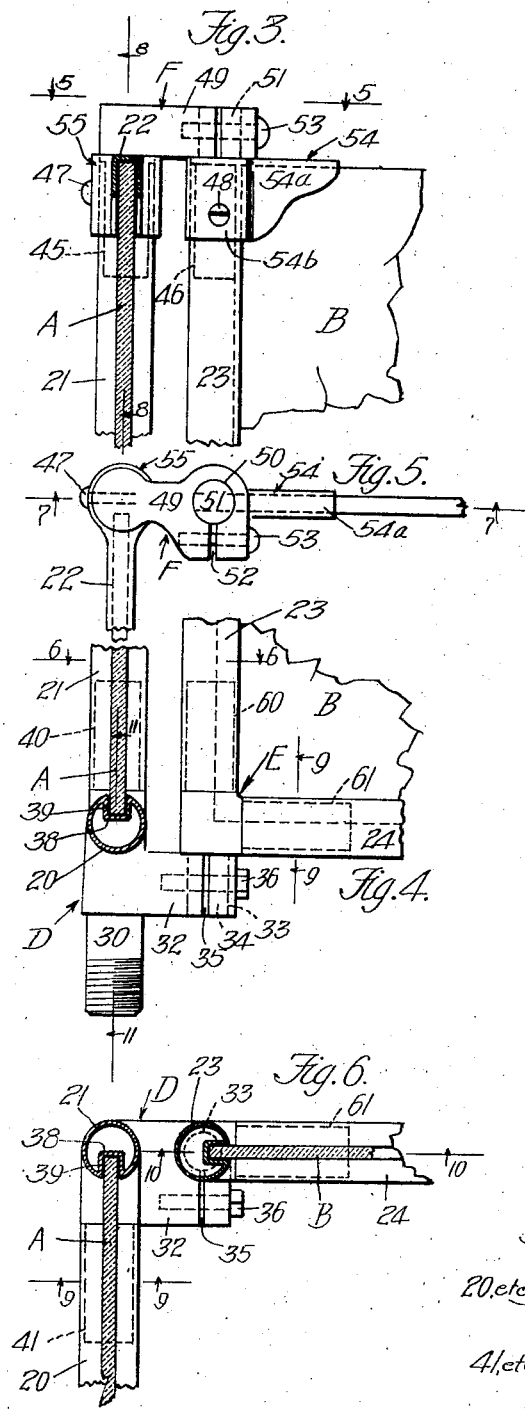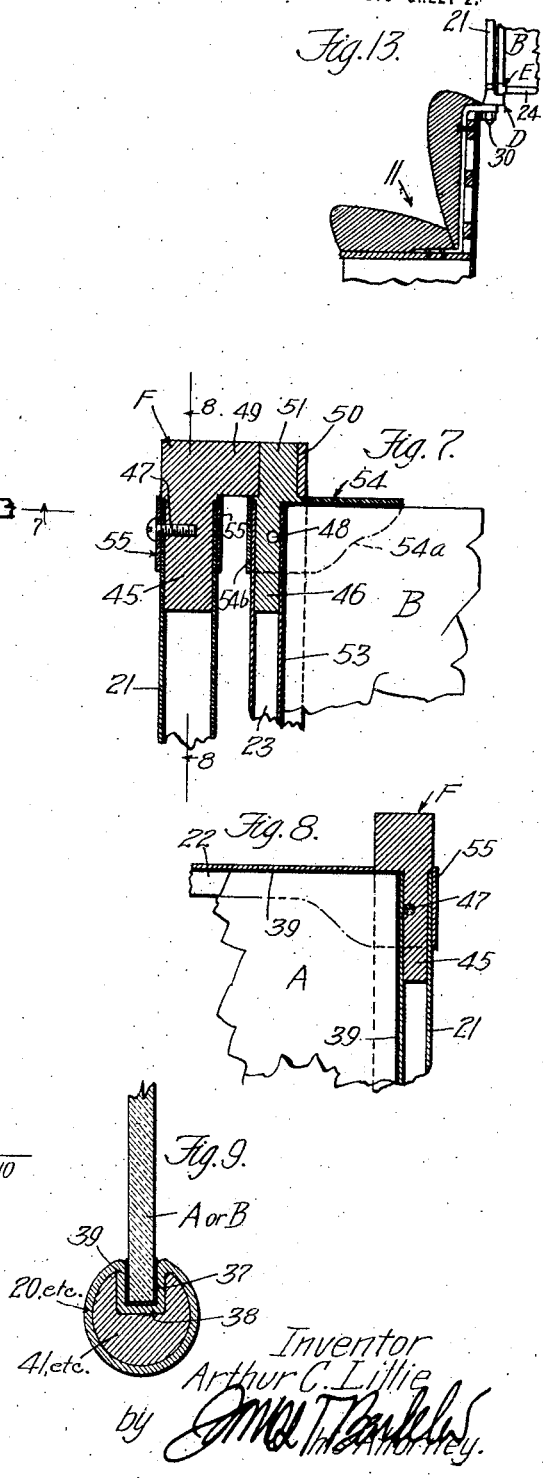

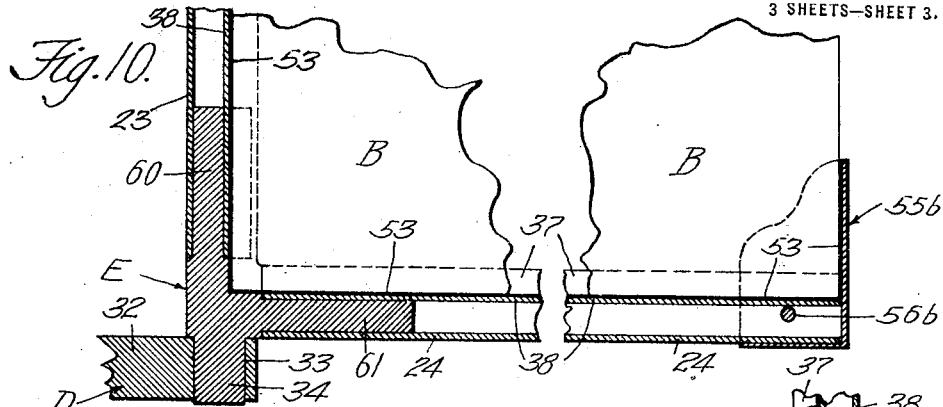
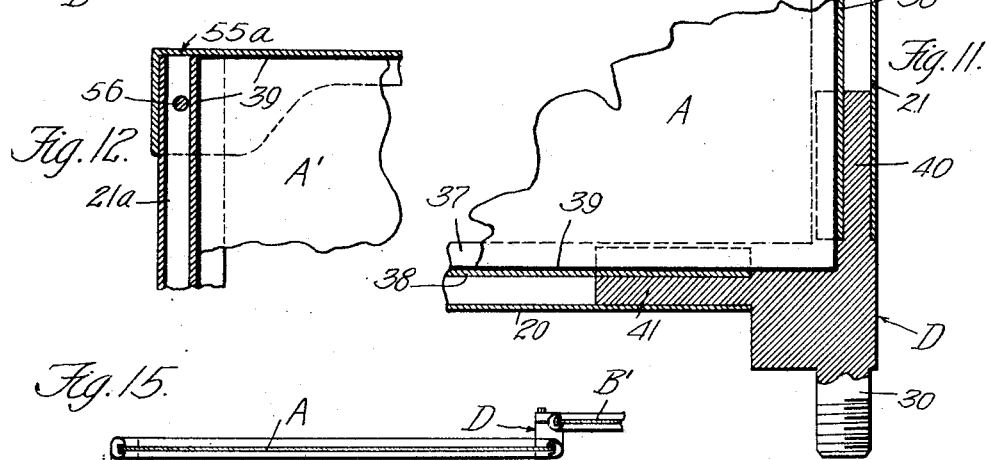
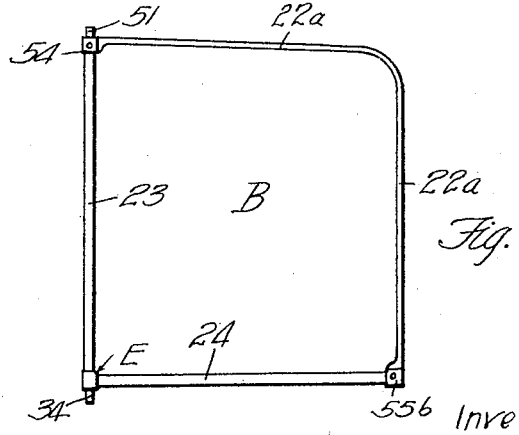

ARTHUR C. LILLIE, OF LOS ANGELES, CALIFORNIA.

WINDSHIELD.

1,412,474. Specification of Letters Patent. Patented Apr. 11, 1922.

Application filed July 15, 1918. Serial No. 245,027.

*To all whom it may concern:*

Be it known that I, ARTHUR C. LILLIE, a citizen of the United States, residing at Los Angeles, in the county of Los Angeles, State of California, have invented new and useful Improvements in Windshields, of which the following is a specification.

This invention relates to windshields, and particularly to adjustable windshields of a type adapted to be used (although not limited to that use) behind the forward seat or seats of an automobile to protect the occupants of the rear seat or seats. It is a general object of the invention to provide a simple and effective construction which will rigidly and strongly support the glass or other transparent member which forms the body of the windshield, and at the same time be easily and readily adjustable.

As a further object of this invention I may particularly mention the object of providing a shield that has not only utilitarian value but also adds to the sightliness of the automobile; giving to the automobile to a certain extent the protection and the desirable appearance which is ordinarily associated with an enclosed car. Further objects of the invention will be best understood from the following detailed description of preferred forms of devices which embody the invention; reference for this purpose being had to the accompanying drawings in which—

Fig. 1 is a perspective view of one form of device embodying the invention; Fig. 2 is a perspective view of another form of the device, applicable to certain types of automobile bodies; Fig. 3 is an enlarged detail section taken on lines 3—3 of Figs. 1 and 2; Fig. 4 is an enlarged detail section taken on lines 4—4 of Figs. 1 and 2; Fig. 5 is a detail plan taken as indicated by line 5—5 on Fig. 3; Fig. 6 is a horizontal detail section taken on line 6—6 of Fig. 4; Fig. 7 is a vertical section taken on line 7—7 of Fig. 5; Fig. 8 is a vertical section taken on lines 8—8 of Figs. 3 and 7; Fig. 9 is an enlarged detail section taken on lines 9—9 of Figs. 4 and 6; Fig. 10 is a vertical section taken on line 10—10 of Fig. 6; Fig. 11 is a vertical section taken on line 11—11 of Fig. 4; Fig. 12 is a vertical section of a certain part shown on Fig. 2, reference to which will be hereinafter had; Fig. 13 is a section taken as indicated by line 13 on Fig. 2 showing an approved method of mounting the windshield upon the automobile; Fig. 14 is a view showing a modification; and Fig. 15 is a horizontal section showing a modified arrangement.

In Fig. 1 of the drawings I show a central transparent or glass panel at A and two side panels at B which are pivotally adjustable about vertical axes at their inner edges so that they may be swung outwardly to the position shown in Fig. 1, or may be swung further outwardly so that they are in a position of parallel extension of the panel A; or so that they may be swung inwardly and forwardly to lie against the main transparent panel A. The width of a side panel is preferably half or less than half the width of the central panel. To the under edge of each of these transparent panels (or to the framing which holds the panels B) I secure a curtain or flap C, in any suitable manner. The forward vertical edge of this curtain may be buttoned or otherwise secured at 10 to the body of the machine; and this curtain is for the purpose of preventing wind passing under the lower edges of the side panels B. Means, such as a snap-button means, may be provided at the rear edges of the curtains and upon the body of the automobile, as shown at 12, for securing the rear edges of the curtains to prevent the wind raising them.

In Fig. 2 I show, instead of a single, central main panel A, two stationary panels A' mounted each upon the back of an individual seat 11. This form of device is for automobile bodies with a passage between the two front seats. At the outer edges of these two stationary panels A' I place the two side panels B in the same manner as before; but between the two stationary panels A' I place another swinging panel B' which in all essentials is the same in construction, mounting and operation as one of the panels B, and serves to close the openings between the two stationary panels A'. If desired, a curtain C' may also be attached to the lower edge of this panel.

The details of construction, mounting of the transparent panels, etc., are the same in both the forms herein shown. I will now explain those details, their manner of construction and their mode of operation. In framing the glass panels I preferably use tubular framing and a thin metal channel;

this channel performs as much the office of providing a metal edge for the glass panel as the office of forming a frame; and in the frame this thin metal channel is not a stiff and rigid member but acts merely as a tie to tie frame parts together. The stationary glasses of panel A or of the panels A' are framed each by a lower horizontal tubular frame member 10 and by upright tubular frame members 21, and by an upper horizontal channel member 22 which extends between the upper ends of the upright tubular members 21 and ties them together. The side panels B and B' are framed by an upright tubular frame member 23 at their inner vertical edges and by a lower horizontal tubular frame member 24 at their lower edges; the outer and upper edges of these side panels being unframed.

At the place indicated D in each of the constructions there are corner bracket members which are best illustrated in detail in Figs. 4, 6 and 11. These brackets have on their under sides studs 30 by means of which the brackets are mounted upon mounting brackets 31. Mounting brackets 31, (see Fig. 13) are preferably made of bar iron or steel bent to the configuration shown and secured to the framework on the forward seat 11 under the cushions of the seat; the rear upper end of mounting brackets 31 projecting rearwardly behind the seat a sufficient distance to allow the corner brackets D to be mounted thereon. Each of these corner brackets D has an extension 32 which extends preferably rearwardly from the bracket, and in the end of this extension there is a vertical bore as shown at 33 which takes the pin or trunnion 34 of bracket E located at the lower inner corner of the adjustable transparent panel B. The part 32 may be split as shown at 35 and a screw or bolt 36 may be used to tighten the part around the trunnion 33, so as to hold the bracket E rigidly in position, or so as to make a certain amount of friction sufficient to hold the bracket so that the movable panel B may be moved as desired. The tubular frame members hereinbefore referred to are each of the cross-sectional configuration shown in the drawings and particularly shown in Fig. 9. These members have formed in them a longitudinal groove 37, the groove being formed by walls 38 which are integral with the cylindrical walls of the tube. In grooves 37 the edges of the glass panels are set, a lining of felt or similar substance being interposed at 39. In order to form a strong and rigid connection between the tubular frame members at the corners, the various brackets which are herein described have plugs which enter the ends of the tubes; and, in accordance with this general scheme of construction, the brackets D have upright plugs 40 which enter the lower ends of the upright tubular members and have lateral horizontal plugs 41 which enter the ends of the lower horizontal tubular member 20. These plugs are of a configuration to fit the inner configuration of the tube; that is, the plugs have slots or grooves which take the groove walls 38 of the tube; and the tubes may be sweated, brazed, or otherwise secured on the plug. The construction herein described is typical of all the brackets indicated D in Figs. 1 and 2; and is also typical of the bracket indicated D' in Fig. 2, with the exception that the bracket D' has not the extension 32, because at this point it is not necessary to carry an adjustable panel B. Thus it will be seen that the vertical tubular frame members 21 are joined rigidly, and preferably permanently, to the lower horizontal tubular frame members 20 at the corners of the construction. The glass is slipped into place from above downwardly.

At the top of each of the vertical tubular frame members 21 there is a construction which is best shown in Figs. 3, 5, 7 and 8. At the upper ends of the vertical tubular frame members 21 there are located brackets F which comprise each a vertical plug which extends downwardly into the upper end of tube 21 (being of the same construction as is shown for plug 41 in Fig. 9 and fitting around the grooved portion of the tube) and a horizontal portion 49 which has in its end a vertical bore 50 adapted to receive the pin or pins 51 of a member which comprises this pin 51 and a plug 46 which extends down into the upper end of tubular member 23. In fact, this member, comprised of the parts 51 and 46, may be termed a pivot member as its purpose is to provide merely a turning pin or trunnion for the upper end of tube 23. The part 49 of bracket F is provided with the slot 52 and clamping screw 53 for the purpose of tightening on the pin 51. Glass panel B is set with its inner vertical edge in the groove of tubular member 23, with an interposed felt at 53; but the upper edge of this glass panel is left unframed. At the inner upper corner I merely employ a small corner cap 54. This corner cap has a channel-shaped portion 54ᵃ which fits over the upper edge of the glass and has a cylindrical portion 54ᵇ which fits over and around the upper end of tube 23. This corner cap is held in position with reference to the upper end of tubular member 23, by means of a screw 48; so that the parts are removable in order to remove the glass. The plug 45 of bracket F is also removably mounted in the upper end of the tube 21 and is held in place by a screw 47; this screw 47 also holding in place a cap 55 which fits over and around the end of tube 21. This cap 55 is similar to the corner cap 54; excepting that the cap 55 is joined integrally to the channel-shaped framing member 22 which extends clear across the upper edge of the glass panel A or A' and joins with a similar cap 55 at the opposite vertical edge of the glass. Or, in the case shown at the right in Fig. 2, the other end of this horizontal frame member 22 joins with a cap 55ª which is mounted upon the upper end of the tube 21ª; no bracket or plug construction being used at the upper end of this tube. This is particularly shown in Fig. 12. The cap 55ª is held in place by the screw 56.

It will be readily understood how the glass panels A' are framed by the various members, and how the frame members are joined by the various corner bracket constructions. It will be noted that the glass is held rigid by the permanently connected framework on three sides; only the upper member of the framework being removable for the purpose of inserting or replacing the glass. The glass fits on three of its edges, its lower and two vertical side edges, in the channels 37 of the tubular frame members; and on its upper edge it fits in the channel shaped member 22. On all edges of the glass a felt liner 39 is used.

The lower ends of the vertical tubular frame members 23 are permanently mounted upon vertical plugs 60 of bracket members E, hereinbefore referred to. These bracket members are supported on their pins or trunnions 34 fitting in the bracket members D; and they have horizontally extending plugs 61 which fit into the inner ends of the horizontal lower tubular frame members 24. These plugs 60 and 61 are of the same configuration as hereinbefore explained; and may be brazed or otherwise secured in the tubular frame members. The glass B sits in the grooves 37 of these tubular frame members, felt being interposed at 53 around the edges of the glass. At the outer ends of horizontal frame members 24 there are caps 55ᵇ, removably mounted upon these tubular members 24 and held in place by screws 56ᵇ. The construction of these caps 55ᵇ is the same as that of the caps 55ª, excepting that the caps 55ᵇ are not joined to any edge-framing member 22 but are merely used to cap the outer lower corners of the glasses B. Caps 55ª and 55ᵇ will be closed at their ends; whereas caps 55 and 54 are open at their ends to allow the passage of the plugs 45 or 46.

The glasses B may be left unframed or unbound along their upper and outer edge, as described, or may be bound by a channel shaped binding 22ª which joins the caps 54 and 55ᵇ and extends along the upper and outer edges of the glass. This is shown in Fig. 14.

In order to facilitate snug folding of the form of shield shown in Fig. 2, the brackets at D and F on the right hand edge of the left hand panel A' may be made to project their extensions 32 forwardly instead of rearwardly as is shown and as is usually the case. The brackets D and F, it will be noted are made in "rights" and "lefts"; and by using two sets of "lefts" for the left hand panel A' the panel B' is thrown forward of the panel A' and may then be folded into the forward face of panel A' instead of the rear face. This facilitates the folding of the panel B onto the rear face of panel A'. This arrangement of the parts is shown in Fig. 15 which shows the panel B' situated ahead of panel A'.

When the side panels B are in the approximate positions shown in the drawings or extended directly rearwardly, then they reach rearwardly quite or almost to the forward edges of the rear side curtains (permanent or temporary) of the machine top. Thus, in a body design where the side curtains extend fairly well forwardly, my windshield practically completely closes the forward part of the tonneau space and makes it in effect an enclosed car. I find this construction to be very effective in practical results, enclosing the rear part of the automobile against wind and with fair effectiveness against rain, and making the rear part of an ordinary touring car more comfortable than is ordinarily the case.

Having described a preferred form of my invention, I claim:

1. In a windshield, the combination of a frame comprising bottom and side members rigidly connected together at the bottom corners, said members being relatively rigid and stiff, and forming a relatively rigid frame, and having grooves on their inner faces to receive a glass panel, and an upper non-rigid frame member connected to the upper ends of the side frame members and extending between them as a tie member along the upper edge of the glass, said last mentioned member being an inverted channel to fit over the upper edge of the glass; and a movable side frame embodying exclusively a single side and a single bottom frame member rigidly connected together, said side frame member being pivotally connected at its top and bottom to a side frame member of the first mentioned frame and said pivotal connections each embodying frictional holding means.

2. In a windshield, the combination of a stationary frame embodying bottom and side tubular frame members, bottom corner brackets rigidly secured to the frame members to connect them at the corner, top corner brackets removably mounted on the upper ends of the side frame members, corner caps removably mounted around the upper ends of the side frame members, and a top framing member integral with and extending between the two corner caps; and a movable side frame embodying exclusively a single side and a bottom frame member, a lower corner bracket rigidly connecting said members together and having a pivot pin, a member mounted on the upper end of the side frame member having a pivot pin, and the bottom and top corner brackets of the stationary frame having sockets receiving said pivot pins and adapted to frictionally hold them against turning movement.

3. In a windshield, the combination of a stationary frame embodying bottom and side tubular frame members, bottom corner brackets rigidly secured to the frame members to connect them rigidly at the corners, top corner brackets removably mounted on the upper ends of the side frame members, corner caps removably mounted around the upper ends of the side frame members, and a movable side frame embodying exclusively a single side and a bottom frame member, a lower corner bracket rigidly connecting said members together and having a pivot pin, a member mounted on the upper end of the side frame member having a pivot pin, and the bottom and top corner brackets of the stationary frame having sockets receiving said pivot pins and adapted to frictionally hold them against turning movement.

4. In a windshield, the combination of a stationary frame embodying bottom and side tubular frame members, bottom corner brackets rigidly secured to the frame members to connect them at the corner, top corner brackets mounted on the upper ends of the side frame members, corner caps mounted around the upper ends of the side frame members; and a movable side frame embodying exclusively a single side and a bottom frame member, a lower corner bracket rigidly connecting said members together, a member mounted on the upper end of the side frame member, the bottom and top corner brackets of the stationary frame and the top corner member and bottom bracket of the movable frame having complementary pivot pins and receiving sockets adapted to receive the pins and frictionally hold them against movement.

5. In a windshield, the combination of a stationary frame and a swingingly movable side frame, the frames being made up of hollow frame members and corner brackets, means in fixed relation to the stationary frame for pivotally supporting a lower corner bracket of the side frame, a plug fitted within the upper end of a side member of the stationary frame and rigidly connected to said frame member so as to be nonrotatable with relation thereto, a laterally extending bracket carried by said plug at its upper end, another plug fitted into the upper end of a side member of the movable frame, said last mentioned plug having a trunnion and said bracket at the upper end of the stationary frame member having a socket receiving said trunnion to pivotally support the upper end of the movable frame.

In witness that I claim the foregoing I have hereunto subscribed my name this 28th day of June 1918.

ARTHUR C. LILLIE.